United States Patent [19]

Hoeren et al.

[11] Patent Number: 4,748,556
[45] Date of Patent: May 31, 1988

[54] VARIABLE TRACKING WORD RECOGNIZER FOR DETECTING THE OCCURRENCE OF A DYNAMIC-VARIABLE ADDRESS

[75] Inventors: Gerd H. Hoeren, Lake Oswego; David D. Chapman; Robin L. Teitzel, both of Portland; Steven R. Palmquist, Beaverton, all of Oreg.

[73] Assignee: Tektronix, Inc., Beaverton, Oreg.

[21] Appl. No.: 737,760

[22] Filed: May 28, 1985

[51] Int. Cl.[4] .............................................. G06F 11/30
[52] U.S. Cl. .................................................... 364/200
[58] Field of Search ... 364/200 MS File, 900 MS File, 364/486, 580; 324/73 R, 73 AT

[56] References Cited

U.S. PATENT DOCUMENTS

| | | | |
|---|---|---|---|
| 3,906,454 | 9/1975 | Martin | 364/200 |
| 4,048,671 | 9/1977 | Callahan et al. | 364/200 |
| 4,166,290 | 8/1979 | Furtman et al. | 364/200 |
| 4,338,660 | 7/1982 | Kelly et al. | 364/200 |
| 4,434,488 | 2/1984 | Palmquist et al. | 324/73 |
| 4,495,565 | 1/1985 | Thompson | 364/200 |
| 4,636,940 | 1/1987 | Goodwin, Jr. | 364/200 |

Primary Examiner—Raulfe B. Zache
Assistant Examiner—M. Ure
Attorney, Agent, or Firm—John P. Dellett; Francis I. Gray; Boulden G. Griffith

[57] ABSTRACT

A variable tracking word recognizer generates an indicating signal when a microprocessor has accessed a memory stack location storing a dynamically addressed variable, the address of the variable being the sum of a dynamically assigned base address of the memory stack and a known address offset where the variable is stored on the stack in relation to the base address. The variable tracking word recognizer stores the dynamically assigned base address, when determined by a space allocation subroutine of a program running on the microprocessor, and then monitors the addresses subsequently appearing on the microprocessor address bus, generating the indicating signal when the current address matches the combination of stored base address and known address offset. The variable tracking word recognizer comprises circuitry to generate a storage control signal when the base address appears on the data bus of the microprocessor, a base register for storing the base address on occurrence of the storage control signal, an arithmetic logic unit for determining the difference between the number stored in the base register and each address appearing on the microprocessor address bus, and a conventional word recognizer to generate the indicating signal when the difference so generated equals the known offset.

5 Claims, 3 Drawing Sheets

| ADDR | DATA |
|---|---|
| G+9 | nfact (1) |
| G+8 | X = 1 |
| G+7 | nfact (2) |
| G+6 | X = 2 |
| G+5 | nfact (3) |
| G+4 | X = 3 |
| G+3 | nfact (4) |
| G+2 | X = 4 |
| G+1 | Y |
| G | n |

OFFSET (from G to G+9), BASE at G

| ADDR | DATA |
|---|---|
| F ⋮ E | PROGRAM: FACTORIAL |
| D ⋮ C | PASCAL |
| B ⋮ I ⋮ A | OPERATING SYSTEM (BASE POINTER) |

VARIABLE TRACKING WORD RECOGNIZER FOR DETECTING THE OCCURRENCE OF A DYNAMIC-VARIABLE ADDRESS

BACKGROUND OF THE INVENTION

The present invention relates in general to data acquisition systems and in particular to a method and apparatus for recognizing when a program running on a processing device has accessed the memory location of a dynamically addressed variable.

Word recognizers generate an indicating signal when a selected data word appears on a bus such as a data or address bus of a microprocessor. Data acquisition systems, such as those used in conjunction with a logic analyzer, often use these indicating signals to start or stop data acquisition. In some applications, where a microprocessor is running a higher level language program, it may be desirable to start or stop data acquisition at some point after the program accesses a particular variable stored in memory. In programming languages where the memory address at which each variable is stored are known beforehand it is necessary only to program a word recognizer to initiate an indicating signal when the memory address associated with the particular variable appears on the address bus of the microprocessor. However, when a microprocessor is running a program written in a language such as Pascal, C or Algol, variables are dynamically addressed in that each program variable is on a memory stack during program operation and its memory address is, unknown prior to program operation. Therefore it is not possible to determine when the program has accessed the variable using a simple word recognizer.

What is needed and would be useful is a method and apparatus for recognizing when a microprocessor has accessed the memory location of a dynamically addressed variable.

SUMMARY OF THE INVENTION

According to one aspect of the invention, a variable tracking word recognizer is adapted to generate a first indicating signal when a microprocessor has accessed a memory location where a dynamically addressed variable is stored, the address of the variable being the sum of a dynamically assigned base address of a memory stack and a known address offset where the variable is stored on the stack in relation to the base address. The variable tracking word recognizer first stores the dynamically assigned base address, determined by a program running on the microprocessor, and then monitors the addresses subsequently appearing on the microprocessor address bus, generating the first indicating signal when the current address matches the sum of the stored base address and known address offset.

According to another aspect of the invention, the variable tracking word recognizer comprises a base register for storing the base address when it appears on the microprocessor data bus, an arithmetic logic unit for differencing the number stored in the base register and each address appearing on the microprocessor address bus, and a first circuit to generate the first indicating signal when the difference so generated equals the known offset.

According to still another aspect of the invention, a second circuit is provided to generate a second indicating signal when a non-dynamically assigned memory address of a pointer variable indicating the base address of the stack appears on the address bus during a write cycle. The second indicating signal is applied to a strobe control of the base register such that the base register stores the base address pointer appearing on the data bus as it is being written into memory.

According to a further aspect of the invention, a third circuit is provided to generate a third indicating signal when a non-dynamically assigned memory address associated with a selected program subroutine which establishes the memory stack appears on the microprocessor address bus. The third indicating signal then enables the second means to generate the second indicating signal when the second means determines that the base pointer address is being accessed during a write cycle. The variable tracking recognizer first determines when the subroutine establishing the stack is called, then stores the base address in the base register when it appears on the data bus as it is written to the base pointer memory address, and finally generates the first indicating signal when the current address on the address bus matches the address at which the selected variable is stored, the sum of the stored base address and a known address offset.

Accordingly it is an object of the invention to provide a method and apparatus capable of generating an indicating signal when a dynamically addressed variable has been accessed by a program running on a microprocessor.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT

Figure 1:
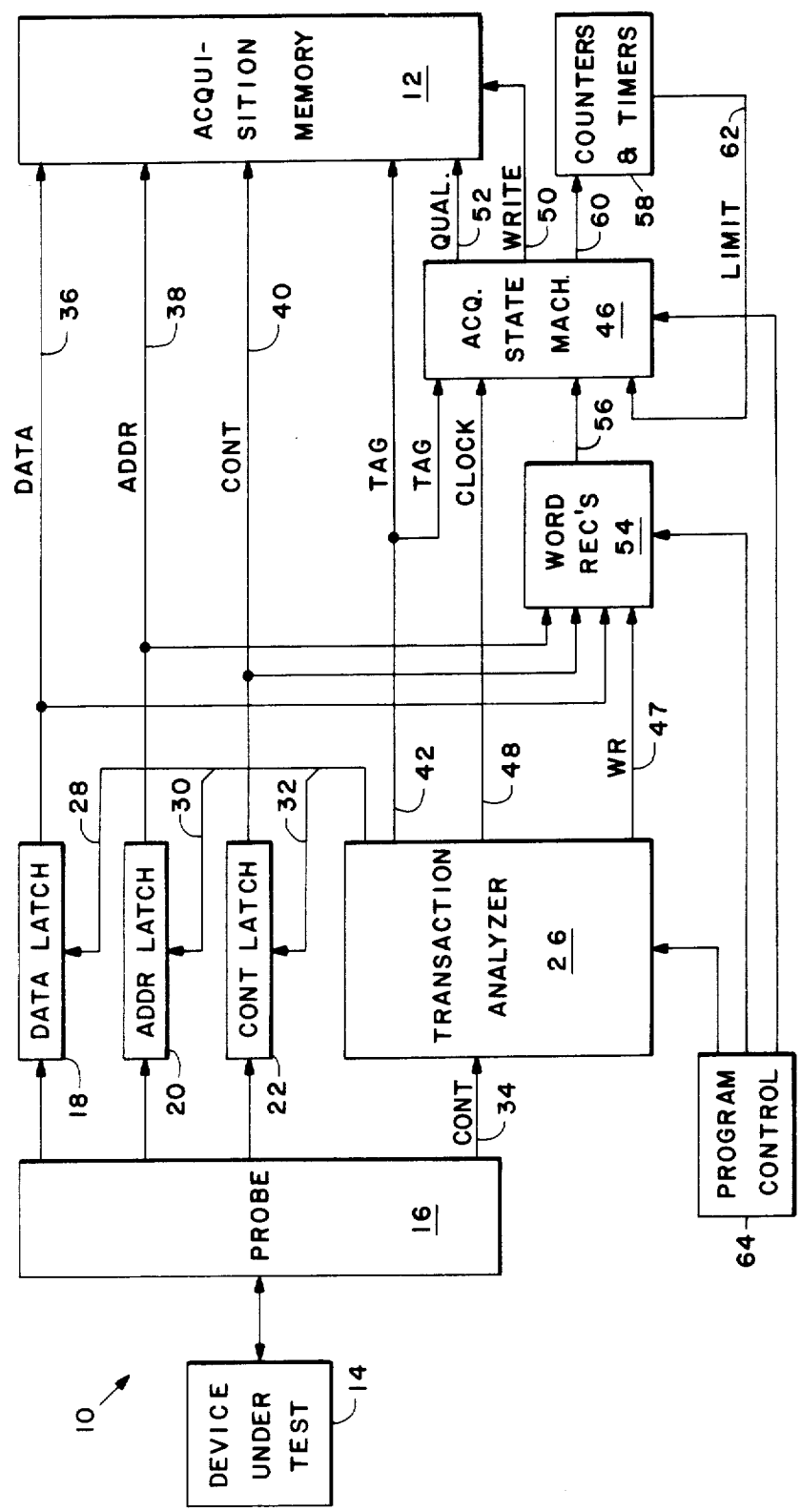
FIG. 1 is a block diagram of a data acquisition system illustrating the use of the present invention.

Referring to FIG. 1, a data acquisition system 10, illustrated in block diagram form, is adapted to acquire and store in a random access acquisition memory 12 a sequence of states of data, address and selected control line outputs of a microprocessor operating in device under test 14. System 10 comprises probe 16 which connects the data, address and a selected portion of the control lines appearing on the pins of the microprocessor under test to data, address and control latches 18, 20 and 22 through internal buffers and programmable cross-connect wiring in the probe. Probe 16 also connects other selected control lines appearing at the pins of the microprocessor to the input of transaction analyzer 26 over lines 34.

Transaction analyzer 26 controls the storage of the data, address and control information from probe 16 by latches 18, 20 and 22 by transmitting appropriate latching control signals on control output lines 28, 30 and 32 to the latches at the appropriate times according to the state of the selected control line data on lines 34. Data stored in latches 18, 20 and 22 is carried on data, address and control line busses 36, 38 and 40 from the latches to the data input terminals of acquisition memory 12. The transaction analyzer 26 also generates a CLOCK signal each time the transaction analyzer causes latches 18, 20 and 22 to store new data from probe 16. The CLOCK signal is transmitted to acquisition state machine 46 over line 48.

In addition, transaction analyzer 26 determines from the state of the selected control line data on lines 34 the type of transaction, such as a read or a write operation, being performed by the microprocessor of device 14, and generates a binary coded TAG signal on bus 42 representing the type of transaction the TAG signal being input to data input terminals of acquisition memory 12. This allows any system using the data stored in the acquisition memory to determine the type of transaction that is occurring in conjunction with the data, address and control data also stored by the acquisition memory. The same TAG signal is also carried on bus 42 to acquisition state machine 46. Transaction analyzer 26 may also generate a single bit indicating signal WR on line 47 to one or more word recognizers 54 when valid data appears on data bus 36 during a write transaction. The purpose of this indicating signal and word recognizers 54 is discussed hereinbelow. A transaction analyzer similar to transaction analyzer 26 is more fully disclosed in copending U.S. patent application No. 730,418 filed May 6, 1987.

Acquisition state machine 46 controls the data storage operation of acquisition memory 12, transmitting a WRITE signal on line 50 to the write control input of memory 12 on receipt of a CLOCK signal from transaction analyzer 26, causing memory 12 to increment its address by 1 and to store in memory at the new address the data on lines 36, 38, 40 and 42. When the current memory address is incremented past its largest possible number, the address is reset to the lowest number and the current data is written over prior stored data at that address.

Acquisition state machine 46 also generates and transmits over line 52 to memory 12 a QUALify bit. Acquisition state machine 46 may be programmed such that it may not generate a WRITE signal every time it receives a CLOCK signal from transaction analyzer 26 so that the sequence of data stored in memory 12 contains gaps wherein data representing one or more successive microprocessor transactions was not stored in memory 12. The QUAL bit is set and stored with the current data on lines 36, 38, 40 and 42 whenever such a gap in data storage has occurred immediately prior to storage of the current data.

A set of one or more word recognizers 54 may be programmed to transmit indicating signals over lines 56 to acquisition state machine 46 whenever specific patterns of data, address or control signals appear on lines 36, 38 or 40. The acquisition state machine 46 may be programmed to start or stop generating WRITE signals on receipt of selected indicating signals from a word recognizer 54 or on receipt of selected TAG signals from transaction analyzer 26.

In addition to starting or stopping WRITE signals based on selected logical combinations of TAG and word recognizer indicating signals, acquisition state machine 46 may also be programmed to set and initiate the operation of various counters and timers 58 using control lines 60. When a counter or a timer reaches a predetermined limit, an appropriate LIMIT signal is transmitted over lines 62 to acquisition state machine 46 which then may use the limit information to start or stop the WRITE signals. For instance, it may be desirable to stop saving data in acquisition memory 12 one hundred microprocessor transactions after a selected address appears on lines 38. In this case, one word recognizer 54 is programmed to recognize the selected address on lines 38 and to generate an indicating signal to state machine 46 when the selected address appears. One counter 58 is programmed to generate a LIMIT signal on line 62 when it receives 100 pulses over line 60. On receipt of the indicating signal, state machine 46 begins transmitting a count pulse over line 60 each time it receives a CLOCK pulse. When it detects the LIMIT signal on line 62, it ceases generation of WRITE signals to memory 12, thereby terminating data storage.

Word recognizers 54, state machine 46 and transaction analyzer 26 may all be programmed prior to initiation of data acquisition through program control device 64 which may be a microprocessor system having control, address and data lines to each of the controlled devices.

In some applications, where a microprocessor within device 14 under test is running a higher level language program, it may be desirable to start or stop data acquisition at some point before or after the program accesses a particular variable stored in memory. In some programming languages, the memory address at which each variable is stored is known beforehand. In such a case, it is necessary only to program a conventional word recognizer 54 to initiate an indicating signal to acquisition state machine 46 when the memory address associated with the particular variable appears on address bus 38. However, when the microprocessor is running a program written in a language such as Pascal, C, or Algol, the memory address of each program variable is dynamically assigned, the variable being stored at some location on a memory stack during program operation which is unknown prior to program operation. Therefore it not possible to determine when the program has accessed the variable by using only a simple word recognizer. By way of example, a typical Pascal program which might run on a microprocessor within device under test 14 may be as follows:

```
program factorial (input, output);
var
    n,y : integer;
begin
    read(n)
    y := nfact(n);
    write (y);
end
procedure nfact(x)
var
    x : integer;
begin
    if x<2
        then nfact := 1
        else nfact := nfact(x-1) * x
end.
```

This program, called "factorial", determines the factorial of any input integer number n and then writes the factorial to a screen. The y:=nfact(n) line calls the procedure "nfact(x)" a first time and passes the current value of the n variable to a local variable x in the procedure. If x is one (i.e. less than two) then the value of the variable nfact is set to one and the procedure ends. However, if x is larger than two, for instance if x is four, then the value of nfact is determined by the line "nfact(x−1)* x. However, since nfact(x−1) is not yet known, the value of nfact when x equals four cannot be determined. So the procedure nfact(x) calls itself a second time with x equal to three, a third time with x equal to two, and a fourth time with x equal to one. At this point nfact is determined by the line "then nfact:=1".

The fourth procedure call then ends, returning the value 1 for nfact(x−1) to the third procedure call which can now compute the value of nfact for x=2. The third procedure call then ends returning the value 2 for nfact(x−1) to the second procedure call. The process continues until the first procedure call computes the value of nfact for x=4 and returns it to the main program as y. The value of y is then printed by the "write (y)" line and the program ends.

Figures 2, 4:
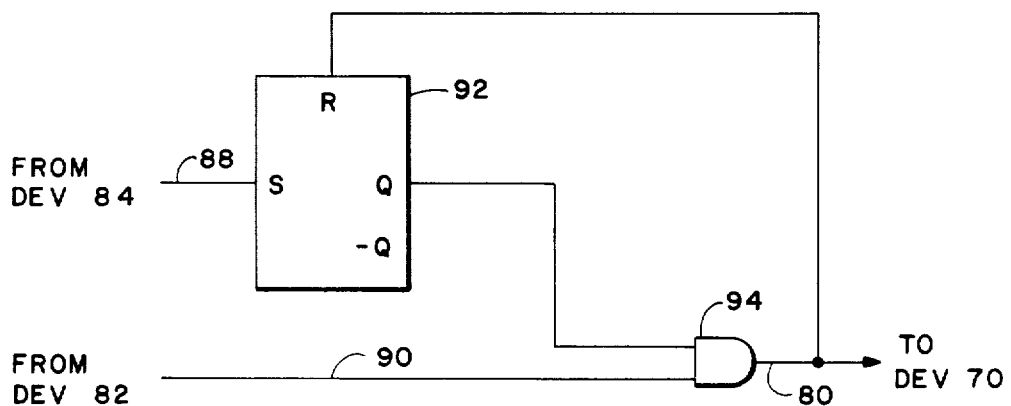
FIG. 2 is a map of a random access memory allocation scheme as may occur when a typical Pascal program is running on a microprocessor system.
FIG. 4 is a block diagram of the logic circuit of FIG. 3.

Referring to FIG. 2, there is depicted a map of the way a random access memory in device under test 14 might be allocated during the operation of this program. An operating system is stored in a particular part of memory between addresses A and B, the Pascal language is stored between addresses C and D, while the program factorial is stored between addresses E and F. These addresses are fixed (not dynamically assigned) and may be ascertained by an operator prior to running the program. During program operation, a "stack" is created for storing data generated by the factorial program. The starting (base) address of the stack is determined by a space management subroutine residing in the operating system which is called when the factorial program first begins to require storage space for variables used by the program. This base address is dynamically assigned and therefore generally cannot be ascertained prior to program operation.

When the program factorial begins, it requests storage space for the variable n by calling the space management subroutine to establish a memory stack. The space management subroutine determines the base address of the stack and stores that address as a variable (the address pointer) in a particular location I in memory. This pointer address is fixed and may be determined by an operator prior to program operation. The next time the program requests memory space for a new variable, the space management routine assigns it the base address number incremented by one. (In some systems, the second variable is assigned the base address decremented by one.) The third time the program requests memory space for a variable, the space management routine assigns it the base address number incremented by two. As additional variable space is requested, the space management routine continues to assign variable addresses by further incrementing the base address number.

In the example program, the value 4 of n is stored at the base address G since this is the first variable to be stored by the factorial program. The next address G+1 is reserved for the value of y since that is the next variable introduced by the program. Initially the value of y is not known, so no data is loaded into that reserved space. The value of x=4 for the first procedure call is then stored at address G+2, while address G+3 is reserved for the value of nfact to be determined by the first nfact(x) procedure call. Next the value of x=3 for the second nfact(x) procedure call is stored at address G+4 and the address G+5 is reserved for the value of nfact to be determined by the second procedure call. The process continues until the value of X=1 is stored at address G+8 and the value 1 of nfact determined by the fourth procedure call is stored at address location G+9. After the fourth procedure call ends, the third procedure call multiplies the value of nfact stored at address G+9 times the value of x stored at G+6 and stores the result as nfact at reserved address G+7. After the third procedure call ends, the second procedure call multiplies the value of nfact stored at address G+7 times the value of x stored at address G+4 and stores the result at address G+5. Finally the first procedure call multiples the value of nfact stored at address G+5 times the value of x stored at G+3 and stores the result as y at reserved address G+1. The first call then ends and the main program prints this value of y stored at address G+1 and then also ends.

Referring again to FIG. 1, if device under test 14 is a microprocessor running the example program, it may be desirable to start or stop data acquisition in some relation to the moment the microprocessor computes one of the variables associated with the program. For instance, it may be desirable to start data acquisition when the value of nfact is determined for x=1. It may be possible to program a conventional word recognizer 54 to generate an indicating signal to the acquisition state machine 46 when the address G+9 appears on address bus 38. However, this address is generally not known before the program is run and therefore a conventional word recognizer alone cannot be used to generate such an indicating signal.

Figure 3:
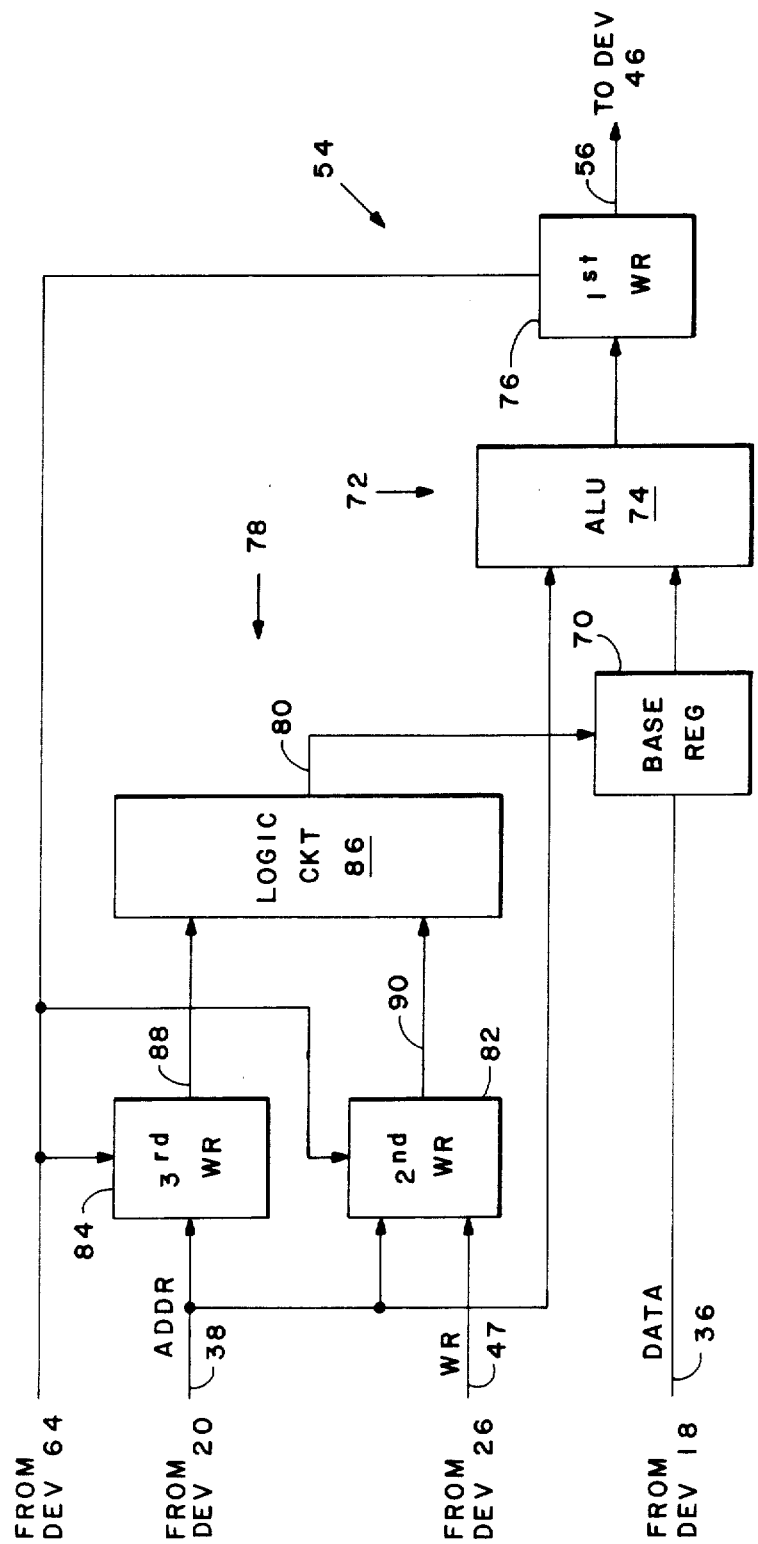
FIG. 3 is a block diagram of the preferred embodiment of the present invention.

Referring again to FIG. 1, there may be several word recognizers 54 in data acquisition system 10, some of which may be conventional word recognizers while one or more may be variable tracking word recognizers according to the present invention. In FIG. 3, a reloadable word recognizer 54 according to the present invention, illustrated in block diagram form, is adapted to generate a first indicating signal on line 56 to acquisition state machine 46 when a microprocessor in device 14 under test has accessed a memory location, such as G+9 in the present example, where a dynamically addressed variable is stored. The address of the variable is a combination of a dynamically assigned base address G of a memory stack and a known address offset (i.e. +9) where the variable is stored on the stack in relation to the base address. The variable tracking word recognizer stores the dynamically assigned base address in base register 70 when it is determined by a space allocation subroutine of a program running on the microprocessor and then employs first monitoring means 72 to monitor the addresses subsequently appearing on address bus 38, generating the first indicating signal on line 56 when the current address matches the sum of the stored base address and the known address offset.

First monitoring means 72, in the preferred embodiment, comprises arithmetic logic unit (ALU) 74 and a first conventional word recognizer 76. The base address stored in register 70 is applied to a first input of ALU 74 while the address bus 38, from address latch 20 of FIG. 1, is applied to a second input of ALU 74. ALU 74 then subtracts the base address number appearing at its first input from the current microprocessor address appearing at its second input and transmits the result to first word recognizer 76. Word recognizer 76 is preprogrammed to generate the first indicating signal when the difference number from ALU 74 appearing at its input terminals is the address offset (i.e. +9) of the selected dynamically stored variable.

Second monitoring means 78 is provided to generate a fourth indicating signal on line 80 to a storage control input of base register 70, causing register 70 to store the stack base address (e.g. address G in the example program) when the base address appears on the data bus 36. Second monitoring means 78, in the preferred embodiment, comprises second conventional word recognizer 82, third conventional word recognizer 84, and logic circuit 86.

Third word recognizer 84 is preprogrammed to generate a third indicating signal on line 88 to logic circuit 86 when a memory address containing the first instruction of the program or procedure establishing the memory stack appears on address bus 38. In the example, this is address E containing the first instruction of the factorial program. This address is not dynamically assigned and therefore would be ascertainable by an operator prior to running the program.

Address bus 38 and the write cycle WR indicator from transaction analyzer 26 are applied to the inputs of second word recognizer 82. Second word recognizer 82 is preprogrammed to generate a second indicating signal on line 90 to logic circuit 86 when the address of the stack base pointer (e.g. address I in the example) appears on address bus 38 during a write cycle. The base pointer address is also fixed and can be determined by the operator before running the program.

Logic circuit 86 generates the fourth indicating signal on line 80 when it receives the second indicating signal from the second word recognizer 82 after having received the third indicating signal from the third word recognizer 84. At this point, the program has called the space allocation subroutine to set up the stack and the space allocation routine is writing the base address to its pointer address. Therefore, the base address is on data bus 36 and may be stored by base register 70 on receipt of the fourth indicating signal from logic circuit 86. With the base address so stored, first monitoring means 72 will generate the first indicating signal to acquisiton state machine 46 at the appropriate time as described hereinabove.

Conventional word recognizers capable of performing the functions of the first, second and third word recognizers and devices capable of performing the function of arithmetic logic unit 74 are commonly available and well known in the art and are therefore not further detailed herein. A more detailed embodiment of logic circuit 86, depicted in block diagram form in FIG. 4, comprises RS flip-flop 92 and AND gate 94. The third indicating signal from third word recognizer 84 on line 88 is applied to an S input of RS flip-flop 92, while a Q output of RS flip-flop 92 is applied to one input of AND gate 94. The second indicating signal from second word recognizer 82 on line 90 is applied to a second input of AND gate 90. RS flip-flop 92 sets its Q output high when it receives a high third indicating signal at the S input. When the second indicating signal also goes high, the output of AND gate 94, the fourth indicating signal, also goes high. In addition to being transmitted to the base register 70 write control input on line 80, the fourth indicating signal is also fed back to a reset terminal of RS flip-flop 92 to reset the flip-flop.

While the variable tracking word recognizer of the present invention has been illustrated in conjunction with the data acquisition system 10 of FIG. 1, the use of the present invention is not limited thereto but may be employed in conjunction with any system accessing the necessary address and data busses and providing the appropriate write cycle indicating signal. Such a write cycle indicating signal is directly available as a control line output of many microprocessors.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for determining when a program running on a processing device accesses a memory address of a dynamically addressed variable, the apparatus comprising:
   first means for determining when a base address occurs on a data bus associated with the processing device, the first means including
      second means for determining when a selected program step has occurred after which the base address is established, and
      third means for determining when the base address is being written to a base pointer address, such that the first means will output a signal upon the occurrence of an indication from the third means that occurs after an indication from the second means;
   means for storing the base address in a storage device when it occurs on the data bus, the means for storing being responsive to the signal from the first means for determining, and
   means for determining when a currently accessed memory address matches the sum of the stored base address and an offset number characterizing a relative address of the variable in relation to the base address and for generating a coincidence signal;
   whereby said coincidence signal indicates that a dynamically addressed variable has been addressed by said processing device.

2. An apparatus as in claim 1 wherein said second means comprises a word recognizer coupled to monitor addresses occurring on an address bus.

3. An apparatus as in claim 1, wherein said third means comprises a word recognizer coupled to monitor addresses occurring on an address bus associated with the processing device and a signal indicating occurrence of a write operation in the processing device.

4. An apparatus for determining when a program running on a processing device addresses a memory address of a dynamically addressed variable, the apparatus comprising:
   means for determining when a selected program step address occurs on an address bus,
   means for determining when a base pointer address occurs on the address bus during a processing device write cycle following an indication from the means for determining when a selected program step address occurs,
   means for storing the base address appearing on a data bus in a storage device in accordance with an indication from the means for determining when a base pointer address occurs, means for determining the difference between the stored base address and a currently accessed address, and means for comparing the difference to an offset number characterizing a relative address of the variable in relation to the base address and for generating a coincidence signal;

whereby said coincidence signal indicates that a dynamically addressed variable has been addressed by said processing device.

5. An apparatus for generating a first indicating signal when a program running on a processing device accesses a memory address of a dynamically addressed variable, the apparatus comprising:

a register for storing a base address occurring on a data bus of the processing device on occurrence of a fourth indicating signal, an arithmetic logic unit for determining the difference between a current address on an address bus of the processing device and the stored base address, a first word recognizer for generating the first indicating signal when said difference matches an address offset characterizing a relative address of the variable in relation to the base address, a second word recognizer for generating a second indicating signal when an address of a base address pointer appears on the address bus during a processing device write cycle, a third word recognizer for generating a third indicating signal when an address of a selected program step appears on the address bus, and a logic circuit for generating the fourth indicating signal on occurrence of the second and third indicating signals.

* * * * *